US010615388B2

(12) United States Patent
Simmons et al.

(10) Patent No.: US 10,615,388 B2
(45) Date of Patent: Apr. 7, 2020

(54) MEMBRANE MADE OF A BLEND OF UHMW POLYOLEFINS

(75) Inventors: Donald K. Simmons, Fayetteville, GA (US); Joseph G. Yaritz, Utica, KY (US)

(73) Assignee: Celgard, LLC, Charlotte, NC (US)

(*) Notice: Subject to any disclaimer, the term of this patent is extended or adjusted under 35 U.S.C. 154(b) by 0 days.

(21) Appl. No.: 11/386,612

(22) Filed: Mar. 22, 2006

(65) Prior Publication Data

US 2007/0221567 A1 Sep. 27, 2007

(51) Int. Cl.

| | |
|---|---|
| *B01D 71/26* | (2006.01) |
| *H01M 2/16* | (2006.01) |
| *D01F 1/02* | (2006.01) |
| *B01D 67/00* | (2006.01) |
| *B29C 55/00* | (2006.01) |
| *H01M 2/14* | (2006.01) |
| *B29C 48/08* | (2019.01) |
| *H01M 10/0525* | (2010.01) |
| *B29L 31/00* | (2006.01) |
| *B29K 105/04* | (2006.01) |
| *B29K 23/00* | (2006.01) |
| *H01M 10/0565* | (2010.01) |
| *B29C 48/00* | (2019.01) |

(52) U.S. Cl.
CPC ........ *H01M 2/1653* (2013.01); *B01D 67/002* (2013.01); *B01D 71/26* (2013.01); *B29C 48/08* (2019.02); *B29C 55/005* (2013.01); *H01M 2/145* (2013.01); *H01M 10/0525* (2013.01); *B01D 2325/02* (2013.01); *B01D 2325/34* (2013.01); *B29C 48/00* (2019.02); *B29K 2023/0683* (2013.01); *B29K 2105/04* (2013.01); *B29L 2031/755* (2013.01); *H01M 10/0565* (2013.01)

(58) Field of Classification Search
CPC ............ B01D 2325/02; B01D 2325/34; B01D 67/002; B01D 71/26; B29C 47/00; B29C 47/0021; B29C 55/005; B29K 2023/0683; B29K 2105/04; B29L 2031/755; H01M 10/0565; H01M 2/145; H01M 2/1653
USPC ........................................................ 429/129
See application file for complete search history.

(56) References Cited

U.S. PATENT DOCUMENTS

| | | |
|---|---|---|
| 3,351,495 A | 11/1967 | Larsen et al. |
| 3,976,612 A * | 8/1976 | Kaji et al. ..................... 524/418 |
| 4,539,256 A | 9/1985 | Shipman |
| 4,588,633 A | 5/1986 | Kono et al. |
| 4,600,633 A | 7/1986 | Kono et al. |
| 4,620,955 A | 11/1986 | Kono et al. |
| 4,650,730 A | 3/1987 | Lundquist et al. |
| 4,734,196 A | 3/1988 | Kono et al. |
| 4,833,172 A | 5/1989 | Schwarz et al. |
| 4,873,034 A | 10/1989 | Kono et al. |
| 5,051,183 A | 9/1991 | Takita et al. |
| 5,248,461 A | 9/1993 | Pluyter et al. |
| 5,281,491 A | 1/1994 | Rein et al. |
| 5,741,848 A | 4/1998 | Nogata et al. |
| 5,786,396 A | 7/1998 | Takita et al. |
| 5,830,554 A | 11/1998 | Kaimai et al. |
| 5,853,633 A | 12/1998 | Kono et al. |
| 5,922,492 A | 7/1999 | Takita et al. |
| 5,948,557 A | 9/1999 | Ondeck et al. |
| 5,993,954 A | 11/1999 | Radovanovic et al. |
| 6,096,213 A | 8/2000 | Radovanovic et al. |
| 6,153,133 A | 11/2000 | Kaimai et al. |
| 6,245,272 B1 | 6/2001 | Takita et al. |
| 6,566,012 B1 | 5/2003 | Takita et al. |
| 6,666,969 B1 | 12/2003 | Funaoka et al. |
| 6,824,865 B1 * | 11/2004 | Funaoka et al. ............ 428/315.5 |
| 2002/0001753 A1 * | 1/2002 | Pekala .................. H01M 2/162 |
| | | 429/249 |
| 2003/0059657 A1 * | 3/2003 | Stone et al. ..................... 429/30 |
| 2006/0121269 A1 * | 6/2006 | Miller et al. ................ 428/317.9 |

FOREIGN PATENT DOCUMENTS

| | | |
|---|---|---|
| JP | 06-212006 | 8/1994 |
| JP | 08-064194 | 3/1996 |
| JP | 2000195490 | * 7/2000 |

OTHER PUBLICATIONS

IPDL JPO Machine Translation for Junichi et al. (Pub. No. JP 2000-195490).*
Schwartz, S. S. and Goodman, S. H., Plastics Materials and Processes, Van Nostrand Reinhold Co., New York, N.Y. pp. 74-77 (1982).*
IPDL JPO Machine translation (JP 2000-195490) Junichi et al.*

* cited by examiner

*Primary Examiner* — Adam A Arciero

(74) *Attorney, Agent, or Firm* — Hammer & Associates, P.C.

(57) ABSTRACT

A membrane is a microporous sheet made of a blend of a first ultra high molecular weight polyolefin and a second ultra high molecular weight polyolefin. Each polyolefin has a molecular weight, both of those molecular weights are greater than 1 million, and one molecular weight is greater than the other. Additionally, the intrinsic viscosity (IV) of the membrane may be greater than or equal to 6.3.

18 Claims, 2 Drawing Sheets

MEMBRANE MADE OF A BLEND OF UHMW POLYOLEFINS

FIELD OF THE INVENTION

The present invention is directed to a microporous membrane made from a blend of ultra high molecular weight (UHMW) polyolefins.

BACKGROUND OF THE INVENTION

Microporous membranes are used in a variety of applications including: separators for electrochemical devices (e.g., batteries, fuel cells, and capacitors), separation devices (e.g., mass transfer devices, and filtration devices), medical devices (e.g., blood oxygenation and dialysis), pressure regulators, synthetic papers, to name a few.

The process for manufacturing microporous polyolefin membranes can be broadly divided into the dry (or CELGARD) process and the wet process.

The CELGARD process involves melting a crystalline polyolefin resin, extruding the melt into a film, annealing the film, and orienting (or stretching) the film to form micropores. The CELGARD process involves no extraction step (i.e., solvent handling), and therefore it is inherently simpler than the wet process.

The wet process involves mixing of a polyolefin resin with a hydrocarbon liquid or some other low molecular weight substance, heating and melting the mixture, extruding the melt into a sheet, orienting (or stretching) the sheet, and extracting the liquid from the sheet with a volatile solvent. The wet process is used to make microporous membranes containing ultra high molecular weight polyethylene (UHMWPE).

The wet process, typically, includes one of the following phase separation mechanisms: (1) liquid-liquid phase separation; or (2) solid-liquid phase separation. The liquid-liquid phase separation, also known as TIPS, refers to formation of a polymer-rich liquid matrix and a dispersed polymer-lean liquid, with subsequent solidification of the polymer. The solid-liquid phase separation, also known as GEL process, refers to polymer crystallization from a melt blend.

Microporous membranes made of UHMWPE which are filled or unfilled with particulates are commercially available from Daramic of Owensboro, Ky., Tonen Chemical of Tokyo, Japan, and Asahi Chemical of Tokyo, Japan. These types of membranes are also disclosed in, for example, U.S. Pat. Nos. 6,824,865; 6,666,969; 6,566,012; 6,245,272; 6,153,133; 6,096,213; 5,993,954; 5,922,492; 5,853,633; 5,830,554; 5,786,396; 5,741,848; 5,281,491; 5,051,183; 4,873,034; 4,734,196; 4,650,730; 4,620,955; 4,600,633; 4,588,633; 4,539,256; and Japanese Patent Nos. 3497569 (Kokai JP08-064194); 3258737 (Kokai JP06-212006).

In one end use, battery separators for secondary lithium ion batteries, there is a continuing demand to decrease the thickness of the separator while maintaining or increasing its strength (i.e., the puncture strength).

Accordingly, there is a need for new membranes to meet these and other requirements.

SUMMARY OF THE INVENTION

A membrane is a microporous sheet made of a blend of a first ultra high molecular weight polyethylene and a second ultra high molecular weight polyethylene. Each polyethylene has a molecular weight, both of those molecular weights are greater than 1 million, and one molecular weight is greater than the other. Additionally, the intrinsic viscosity (IV) of the membrane is greater than or equal to 6.3.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
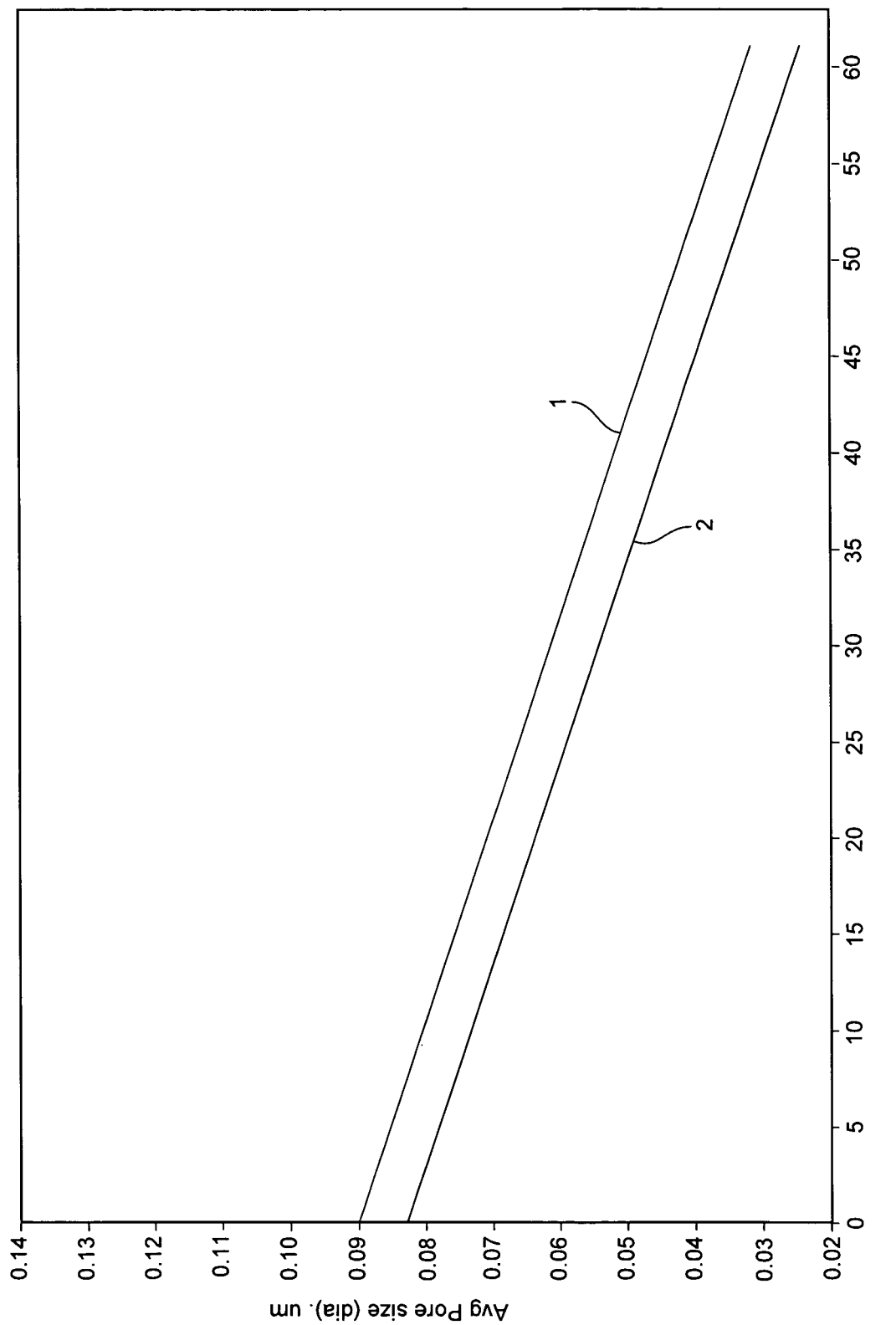
FIG. 1 is a graphical illustration of the relationship between the percent of processing oil remaining in the precursor before stretching and average pore size.

A membrane refers to a microporous sheet made from a blend of at least two ultra high molecular weight polyolefins. These blends will be discussed in greater detail below. The membrane or microporous sheet may be characterized by one or more of the following parameters: thickness, porosity, average pore size, puncture strength, MacMullin Number, Gurley Number, intrinsic viscosity (IV), and shutdown temperature. Each of these will be discussed below.

The thickness of the membrane may be less than 5 mils (125 microns). In another embodiment, the thickness may range from 10 microns to 50 microns. In yet another embodiment, the thickness may range from 10 microns to 25 microns.

The porosity of the membrane may be between 25 and 85%. In one embodiment, porosity ranges from 32-58%. In yet another embodiment, porosity ranges from 43-57%.

The average pore size of the membrane may be between 0.01-0.5 microns. In one embodiment, the average pore size ranges from 0.025-0.09 microns. In yet another embodiment, the average pore size ranges from 0.027-0.054 microns.

The puncture strength may be greater than or equal to 300 gr-force/mil. Puncture strength is determined by averaging 10 measurements across the width of the final product using a Midtech Stevens LFRA texture analyzer and a needle with a 1.65 mm diameter and a 0.5 mm radius recording data at a rate of 2 mm/sec with a maximum amount of deflection of 6 mm.

The MacMullin Number ($N_{mac}$) may be in the range of 6-15. MacMullin Number is a measure of resistance to movement of ions. MacMullin Number is the ratio of the resistance (r) of the electrolyte saturated separator to the resistance ($r_0$) of an equivalent volume of electrolyte. ($N_{mac}=r/r_0$). Also see U.S. Pat. No. 4,464,238 which is incorporated herein by reference.

The Gurley Number (normalized to one mil thickness) may be less than 60 sec/10 cc/mil thickness. In one embodiment, the Gurley number ranges from 12 to 56 sec/10 cc/mil. The Gurley Number is the time in seconds required to pass 10 cc of air through one square inch of a film under a pressure of 12.2 inches of water as measured by a Gurley densometer (e.g., Model 4120) according to ASTM D-726 (B).

The intrinsic viscosity (IV) of the membrane may be greater than or equal to 6.3 dl/g. In another embodiment, the IV may be greater than or equal to 7.7 dl/g. The IV of the film is not the weighted average of the pre-extruded resins composing the membrane because during extrusion the polymers undergo chain scission and the molecular weight is thereby lowered. Intrinsic viscosity, as used herein, refers to the measure of the capability of a polymer in solution to enhance the viscosity of the solution. The intrinsic viscosity number is defined as the limiting value of the specific viscosity/concentration ratio at zero concentration. Thus, it becomes necessary to find the viscosity at different concentrations, and then extrapolate to zero concentration. The variation of the viscosity number with concentration depends on the type of molecule as well as the solvent. In general, the intrinsic viscosity of linear macromolecular substances is related to the weight average molecular weight or degree of polymerization. With linear macromolecules, viscosity number measurements can provide a method for the rapid determination of molecular weight when the relationship between viscosity and molecular weight has been established. IV is measured by first dissolving 0.02 g of the membrane in 100 ml of decalin at 150° C. for one hour, and then, determining its intrinsic viscosity at 135° C. via an Ubbelohd viscometer. This is according to ASTM D4020 (RSV values reported herein).

The shutdown temperature may be less than 140° C. In one embodiment, the shutdown temperature may be less than 135° C. In yet another embodiment, the shutdown temperature may be less than 130° C.

The membrane may be a blend of ultra high molecular weight polyolefins having differing molecular weights. In one embodiment, these ultra high molecular weight polyolefins may be ultra high molecular weight polyethylene (UHMWPE). In another embodiment, the membrane is a blend of a first ultra high molecular weight polyethylene having a first molecular weight and a second ultra high molecular weight polyethylene having a second molecular weight, the first molecular weight and the second molecular weight being greater than 1 million and being different from one another. In another embodiment, the membrane is a blend of a first ultra high molecular weight polyethylene having a first molecular weight, a second ultra high molecular weight polyethylene having a second molecular weight, the first molecular weight and the second molecular weight being greater than 1 million and being different from one another, and a third polyolefin having a third molecular weight, the third molecular weight being less than 1 million. In yet another embodiment, the membrane may have an IV greater than or equal to 6.3 dl/g. In another embodiment, the membrane may have an IV greater than or equal to 7.7 dl/g.

The first ultra high molecular weight polyethylene may have an IV in the range of 7<IV<15. For example, such materials are commercially available from Ticona of Florence, Ky. as GUR 4012 (IV=10).

The second ultra high molecular weight polyethylene may have an IV of greater than or equal to 15. For example, such materials are commercially available from: Ticona of Florence, Ky. as GUR 4120 (4022) (IV=21) and 4130 (4032) (IV=24); and DSM of Beek, Netherlands as STAMYLAN UH 034 (IV=15).

The third polyolefin may be any 'melt processable' polyolefin. 'Melt processable,' as used herein, means that the polymer will flow when melted at its melt temperature. Such melt processable polymers may have a molecular weight less than $1.0 \times 10^6$ and may have a molecular weight less than or equal to $0.5 \times 10^6$. Such polymers include, for example, polyethylene, polypropylene, polybutylene, polypentene. In one embodiment, the polyolefin is polyethylene, for example high density polyethylene (HDPE). For example, such HDPE's are commercially available from Ticona of Florence, Ky. as GHR 8020 (MW=$0.35 \times 10^6$ and 2110 (MW=$0.5 \times 10^6$). One function of this component is to allow shutdown when the membrane is used as a battery separator.

The membrane IV values are measured after formation of the microporous sheet. The membrane IV value is not merely the weighted average of the IV's of the starting materials because during mixing and gellation in the extruder, the polymers undergo chain scission. Chain scission thus results in an IV lower than the weighted average of the starting components.

In those embodiments of the membrane with only the first and second UHMWPE components, the blends may comprise any weight percent of both components, for example 1-99% of each component.

In one embodiment, the blend may comprise 20-80% by weight of the resins of the first component and 80-20% by weight of the second component. In another embodiment with only the first and second components, the blend may comprise 40-60% of the first component and 60-40% of the second component.

In those embodiments of the membrane with the first UHMWPE, second UHMWPE, and third polyolefin, the blend may comprise a weight ratio of first:second:third components of 1-6:1-6:1-6. In another embodiment of this membrane, the ratio of components may be in the range of 1-6:1-3:1-6. In yet another embodiment, the blend may comprise a weight ratio of 1-5.5:1-2:1-5.5.

The membrane may be manufactured by a wet process. The initial resin components may be formed into a dry blend by mixing the initial resin components with about 10% of a processing oil, discussed below. This dry blend may be charged into a twin screw extruder for mixing with the balance of the processing oil being injected into the extruder prior to kneading of all components in the extruder. This mixture may be extruded into a nonporous sheet through a slot die. Optionally, any portion, or all, of the processing oil may be removed from the sheet, via extraction (conventional), prior to orientation (stretching). The sheet may be subjected to orientation, for example, biaxial orientation. Thereafter, if necessary, any remaining processing oil is extracted (i.e., conventional extraction techniques). Alternatively, the initial polymer components may be charged directly into the extruder and all of the oil injected into the extruder prior to the kneading section(s) of the extruder, and then processed as set out above. In either embodiment described above, it is also possible to inject a portion of the oil prior to the first kneading section in the extruder and then inject the balance of the oil after the first kneading section(s). While not necessary, the inclusion of VEL (viscoelastic lubricant), discussed below, has been found beneficial to the processing of the forgoing. At extrusion, the resin may comprise about 10-55% by weight of the total mixture, the balance being processing oil or processing oil and VEL. In another embodiment, at extrusion, the resin may comprise about 10-40% of the total mixture.

Processing oil has little solvating effect on the UHMWPE at lower temperatures (e.g., 60° C.), but has a significant solvating effect at elevated temperatures (e.g., 200° C.). Such oils include paraffinic oils, naphthenic oils, and aromatic oils, as well as other materials including the phthalate ester plasticizers such as dibutyl phthalate, bis(2-ethylene) phthalate, diisodecyl phthalate, dicyclohexyl phthalate, butyl benzyl phthalate, and ditridecyl phthalate. Additional oils, plasticizers, and/or solvents are mentioned in U.S. Pat. Nos. 3,351,495; 4,588,633; 4,833,172; 5,248,461; and 5,948,557, and only the related portions of the foregoing patents with regard to such oils, plasticizers, and/or solvents are incorporated herein by reference.

VEL are compounds that, when added to the foregoing resin mixtures, improve the processability of the mixtures. Improved processability refers to a reduction in fusion time (the time it takes the polymeric system to melt (or dissolve) into a flowable solution). Improved processability is also seen as a reduction in energy consumption by the extruder motor and as a reduction in mixture temperature when comparing systems with and without the lubricants. The results arising from this phenomenon include, but are not limited to, decreasing energy consumption, decreased thermal and mechanical degradation of the polymer, increased polymer strength, decreased machine wear, and increased polymer throughputs.

Such VELs are selected from the material classes consisting of: fatty acid esters, ethoxylated fatty acid esters, glycol esters, PEG esters, glycerol esters, ethoxylated esters, sorbitol esters, ethoxylated sorbitol esters, aromatic ethoxylates, alcohol ethoxylates, mercaptan ethoxylates, modified ethoxylates, amide surfactants, phosphate esters, phosphonate esters, phosphite esters, alkyl sulfates, fatty acid ethers, alkyl ether sulfates, alkylaryl ether sulfates, sulfonates, naphthalene sulfonates, sulfosuccinates, sulfonated esters, sulfonated amides, alkyl ether carboxylates, alkylaryl ether carboxylates, quaternary amines, amino quaternary amines, ethoxylated amines, imidazoline derivatives, betaines, sultaines, aminopropionate, catechol derivatives, saturated fatty acids, unsaturated fatty acids, and combinations thereof. For example, such lubricants are commercially available. An exemplary list is set out in the Table below.

TABLE

| Tradename or Abbreviation | General Class of Surfactants | Specific chemical | Company |
|---|---|---|---|
| Rhodasurf ® LA-12 | Alcohol Ethoxylates | Mixed linear alcohol ethoxylate | Rhodia HPCII |
| Rhodasurf ® LA-3 | Alcohol Ethoxylates | Mixed linear alcohol ethoxylate | Rhodia HPCII |
| Rhodapex ® CD-128 | Alkyl (and Alkyllaryl) Ether Sulfate | Ammonium Linear Alcohol Ether Sulfate | Rhodia HPCII |
| Rhodapon ® BOS | Alkyl Sulfates | Sodium 2-ethylhexyl Sulfate | Rhodia HPCII |
| Rhodapon ® UB | Alkyl Sulfates | Sodium Lauryl Sulfate | Rhodia HPCII |
| Alkamide ® STEDA/B | Amide surfactant | Ethylene Bisstearamide | Rhodia HPCII |
| Igepal ® CO-210 | Aromatic Ethoxylates | Nonylphenol ethoxylates | Rhodia HPCII |
| Igepal ® CO-630 | Aromatic Ethoxylates | Nonylphenol ethoxylates | Rhodia HPCII |
| Igepal ® RC-630 | Aromatic Ethoxylates | Dodecyl Phenol Ethoxylates | Rhodia HPCII |
| Mirataine ® CBS | Betaines, Sultaines, and Aminopropionates | Coco/Oleamidopropyl Betaine | Rhodia HPCII |
| Mirataine ® COB | Betaines, Sultaines, and Aminopropionates | Cocamidopropyl Hydroxy Sultaine | Rhodia HPCII |
| Miranate ® LEC-80 | Ether Carboxylate | Sodium Laureth 13 Carboxylate | Rhodia HPCII |
| Rhodameen ® PN-430 | Ethoxylated Fatty Amines | Ethoxylated (5 moles) tallow amine | Rhodia HPCII |
| Rhodameen ® T-50 | Ethoxylated Fatty Amines | Ethoxylated (50 moles) tallow amine | Rhodia HPCII |
| Calcium Stearate | Fatty acids, saturated | Calcium stearate | |
| Linseed Oil | Fatty acids, unsaturated | Linoleic and linolenic acids | Hardware Store |
| Tung Oil | Fatty acids, unsaturated | Eleostearic acid | Hardware Store |
| Alkamuls ® GMS | Glycerol ester | Glycerol stearate | Rhodia HPCII |
| Kemester ® 1000 | Glycerol trioleate | Glycerol trioleate | Crompton Corp. |
| Alkamuls ® EGDS | Glycol ester | Glycol distearate | Rhodia HPCII |
| Alkamuls ® JK | Guerbet ester | Guerbet diester | Rhodia HPCII |
| Neustrene ® 059 | Hydrogenated tallow glycerol | (30% Palmitic, 60% Stearic) | Crompton Corp. |
| Neustrene ® 064 | Hydrogenated tallow glycerol | (88% Stearic, 10% Palmitic) | Crompton Corp. |
| Miranol ® C2M-SF | Imidazoline derivative | Disodium Cocoampho Dipropionate | Rhodia HPCII |
| Miranol ® JEM | Imidazoline derivative | Sodium Mixed C8 Amphocarboxylate | Rhodia HPCII |
| Antarox ® 724/P | Ethoxylate | | Rhodia HPCII |
| Rhodacal ® N | Naphthalene Formaldehyde Sulfonates | Sodium Naphthalene Formaldehyde Sulfonate | Rhodia HPCII |
| Supragil ™ WP | Naphthalene Sulfonates | Sodium Diisopropyl Naphthalene Sulfonate | Rhodia HPCII |

TABLE-continued

| Tradename or Abbreviation | General Class of Surfactants | Specific chemical | Company |
|---|---|---|---|
| Alkamuls ® EL-620 | PEG Ester | PEG-30 Castor Oil (ricinoleic + oleic + palmitic . . . ) | Rhodia HPCII |
| Duraphos ® 2EHA PO4 | Phosphate Ester | Phosphoric Acid, Mono & Di(2-ethylhexyl) ester | Rhodia HPCII |
| DEHPA ® extractant | Phosphate Ester | Phosphoric Acid, Bis(2-ethylhexyl) ester | Rhodia HPCII |
| Rhodafac ® LO-11A LA | Phosphate Ester | Phosphoric Acid, Blend of linear octyl/decyl alcohol esters | Rhodia HPCII |
| Amgard ® TOF | Phosphate Ester | Phosphoric Acid, Tris(2-ethylhexyl) ester | Rhodia HPCII |
| Albrite ® B(2EH) 2EHP | Phosphonate Ester | Phosphonic Acid, (2-ethylhexyl)-bis(2-ethylhexyl) ester | Rhodia HPCII |
| Octylphosphonic Acid | Phosphonate Ester | Octyl Phosphonic Acid Ester | Rhodia HPCII |
| Rhodaquat ® DAET-90 | Quaternary Amine | Complex ditallow sulfate quaternary amine | Rhodia HPCII |
| Alkamuls ® SML | Sorbitan ester | Sorbitan Monolaurate | Rhodia HPCII |
| Alkamuls ® SMO | Sorbitan ester | Sorbitan Monooleate | Rhodia HPCII |
| Alkamuls ® STO | Sorbitan ester, ethoxylated | Sorbitan Trioleate | Rhodia HPCII |
| OT-75, OT-100 | Sulfosuccinates | Dioctyl sodium sulfosuccinate | Cytec |

Another aspect of the invention relates to a method of controlling the physical properties of the membrane by pre-extraction of a portion of the processing oil (or processing oil and VEL) prior to orientation. It has been determined that physical properties may be strongly affected by the processing oil content of the precursor during orientation. Thus, one may control the physical properties of the membrane by the amount of oil removed from the membrane before orientation.

Figure 2:
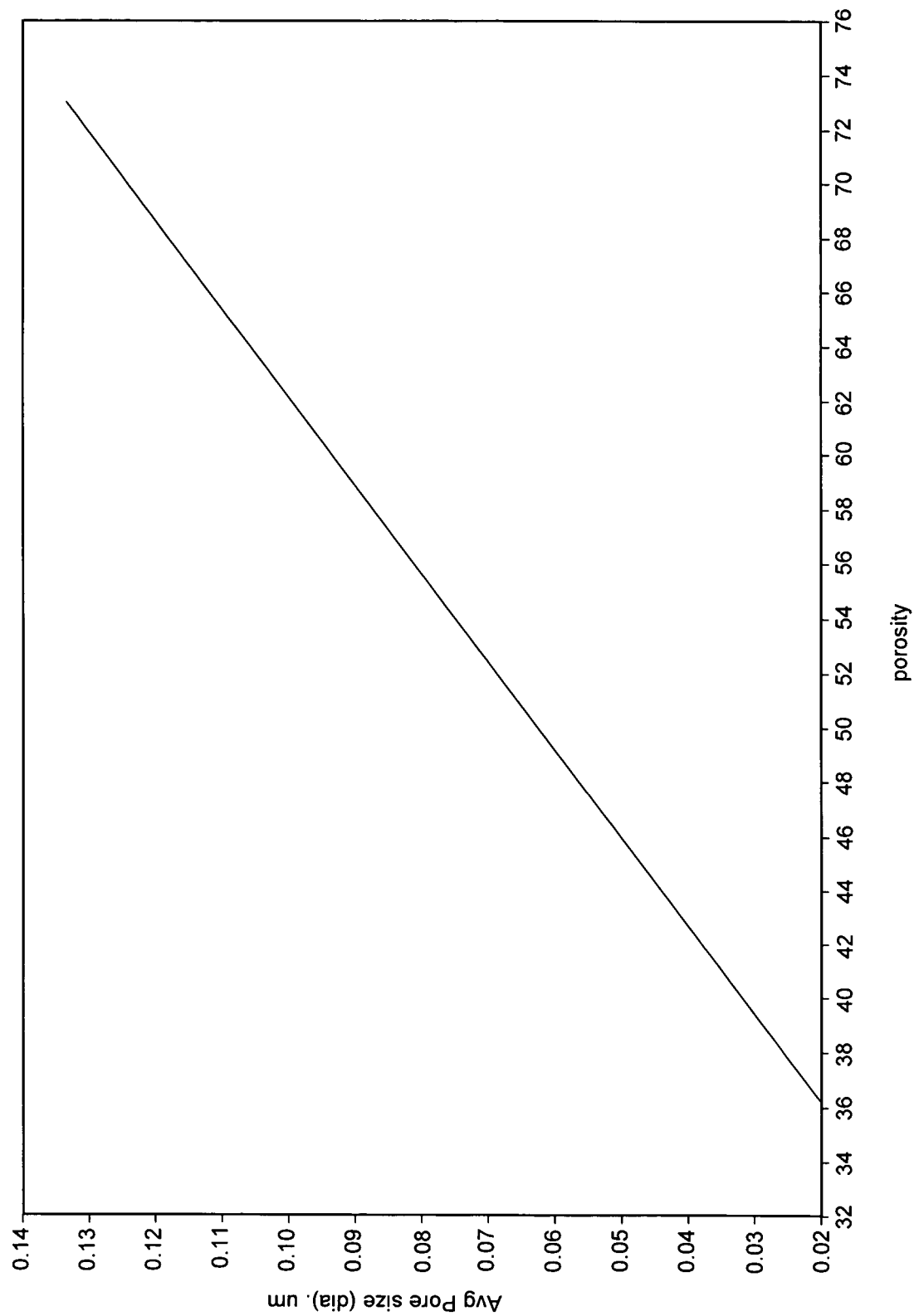
FIG. 2 is a graphical illustration of the relationship between the porosity of the membrane and the average pore size.

For example, average pore size and porosity are strongly affected by the oil content of the precursor prior to orientation. Referring to FIG. 1, a relationship is demonstrated between the % oil (or oil and VEL) remaining in the precursor during stretching (x-axis) and the average pore size (y-axis). Curve 1 illustrates the relationship when the initial (extruded) mixture comprises about 24% resin in oil. Curve 2 illustrates the relationship when the initial (extruded) mixture comprises about 30% resin in oil. One will appreciate that by extracting oil before orientation, then average pore size may be increased. Referring to FIG. 2, a relationship between porosity of the membrane and the average pore size (as determined by the % oil (or oil and VEL) remaining in the precursor during stretching, as demonstrated in FIG. 1) is illustrated. In FIG. 2, the porosity was determined from the membrane samples illustrated in FIG. 1. One will appreciate that by extracting oil before stretching, one will increase the porosity.

EXAMPLES

The present invention is further illustrated by the following non-limiting examples. The property values set forth in the Tables are a compilation of individual runs at the stated conditions. In all of the following examples the initial solution of processing oil (or processing oil and VEL, as indicated) and resins were extruded, via a twin screw extruder, through a slot die, then either 1) subjected to extraction (partial or complete) of the processing oil, then stretched (biaxially), and finally, if necessary, full extraction of any remaining processing oil, or 2) subjected to no pre-stretching extraction, then stretched (biaxially), and finally full extraction of the processing oil. Experimental work included formulations with and without viscoelastic lubricants (VEL). Percent composition means % by weight of the total blend. Ratios are expressed as weight ratios.

In an initial experiment, a microporous film was produced from a formulation containing 33% of HDPE, 33% of a first UHMWPE (IV=10), and 33% of a second UHMWPE (IV=24) with an oil to resin ratio of 3:1, but no VEL. From this work, it was determined that during extrusion, the resin mixture loses between 20-30% of its IV when compared to the weighted average IV of the pre-extruded resin blend. Thus, while it was possible to make the microporous membranes without VEL, the use of VEL is preferred.

In subsequent experimentation, microporous films were produced from formulations set out in Table 1.

TABLE 1

| Formulation | Oil:VEL | HDPE | UHMWPE IV = 10 | UHMWPE IV = 15 | UHMWPE IV = 21 | UHMWPE IV = 24 |
|---|---|---|---|---|---|---|
| A | 10:1 | — | 50 | — | — | 50 |
| B | 3:1 | 33 | 33 | — | 33 | — |
| C | 3:1 | 33 | 33 | — | 33 | — |

TABLE 1-continued

| Formulation | Oil:VEL | HDPE | UHMWPE IV = 10 | UHMWPE IV = 15 | UHMWPE IV = 21 | UHMWPE IV = 24 |
|---|---|---|---|---|---|---|
| D | 3:1 | 33 | 33 | — | — | 33 |
| E | 3:1 | 40 | 20 | — | — | 40 |
| F | 3:1 | 33 | 33 | 33 | — | — |
| G | 3:1 | 55 | 10 | — | — | 35 |

The processing parameters and film properties are set out in Tables 2 (formulations with blends of a first UHMWPE and a second UHMWPE) and 3 (formulations with blends of HDPE, first UHMWPE, and second UHMWPE).

TABLE 2

| Polymer (X) | % Polymer at Extrusion | Stretch Temp C. | Stretch Ratio (Y) | Thickness microns | Gurley Sec/mil | Puncture Strength gr-force | Porosity | Pore Size microns |
|---|---|---|---|---|---|---|---|---|
| A | 24 | 122 | 4 × 4 | 24-28, | 36-38 | 416 | 38 | 0.029 |
| A | 24 | 122 | 5 × 5 | 16-19 | 36-42 | 406-437 | 40-43 | 0.024-0.028 |
| A | 24 | 120 | 4 × 4 | 13-23 | 9-31 | 184-271 | 48-51 | 0.037-0.049 |
| A | 24 | 125 | 4 × 4 | 11-19 | 23-49 | 131-178 | 46-57 | 0.030-0.050 |
| A | 24 | 125 | 5 × 5 | 11-18 | 26-35 | 166-205 | 47-53 | 0.026-0.043 |
| A | 30 | 122 | 4 × 4 | 14-22 | 26-41 | 333-395 | 40-45 | 0.037-0.037 |
| A | 30 | 125 | 4 × 4 | 12-28 | 21-56 | 226 | 43 | 0.039 |
| A | 25 | 115, 120 | 3.6-4.4 | 12.4-19.1 | 24.3-35.5 | | | |

TABLE 3

| Polymer (X) | % Polymer at Extrusion | Stretch Temp C. | Stretch Ratio (Y) | Film IV | Thickness microns | Gurley Sec/mil | Puncture Strength gr-force | MacMullin | Porosity | Pore Size microns | Tortuosity | Shutdown Temp C. |
|---|---|---|---|---|---|---|---|---|---|---|---|---|
| B | 30 | 120 | 4 × 4 | 7.7 | 28 | 9-12 | 367 | | 51 | 0.041 | | |
| B | 30 | 120 | 5 × 5 | 7.7 | 14-17 | 22-32 | 321-340 | 10.9 | 46-48 | 0.027-0.041 | 2.3 | |
| B | 30 | 122 | 4 × 4 | 7.7 | 21 | 10-11 | 254 | 6.1 | 55 | 0.047 | 1.8 | |
| B | 30 | 122 | 5 × 5 | 7.7 | 12-17 | 19-27 | 256-342 | 9.5 | 50-53 | 0.040-0.055 | 2.2 | |
| B | 30 | 122 | 6 × 6 | 7.7 | 14-18 | 27-33 | 383-393 | 9.1-11.9 | 47-49 | 0.029-0.032 | 2.1-2.4 | |
| B | 30 | 125 | 4 × 4 | 7.7 | 19-20 | 7-23 | 213 | | 49 | 0.041 | | |
| B | 30 | 125 | 5 × 5 | 7.7 | 13-17 | 16-21 | 173-249 | | 47-48 | 0.051-0.060 | | |
| B | 30 | 125 | 6 × 6 | 7.7 | 12-13 | 13 | 219 | | 54 | 0.044 | | |
| C | 25 | 115, 120 | 3.9-4.8 | 9.0 | 11.2-18.0 | 25.7-44.7 | 254-407 | 7-15 | 47-50 | 0.033-0.038 | 1.9 | 146 |
| D | 25 | 115, 120 | 3.6-4.8 | 9.2 | 11.4-21.6 | 16.3-53.0 | 260-353 | 7-12 | 43 | 0.029 | | 151 |
| D | 25 | 115, 120 | 3.5-4.6 | 9.5 | 11.7-20.8 | 14.8-54.9 | 313-322 | 8-12 | 49-54 | 0.031-0.041 | 2 | |
| E | 25 | 115, 120 | 3.4-4.9 | 8.9 | 12.2-21.1 | 28.4-52.4 | 358-383 | 10 | 48 | 0.033-0.038 | 2.2 | 145 |
| F | 25 | 115, 120 | 3.7-4.5 | 7.6 | 10.9-17.5 | 12.8-53.5 | 235-387 | 6-8 | 51-57 | 0.037-0.054 | 1.8 | 145 |
| G | 25-35 | 115, 120 | 3.4-4.5 | | 11.2-22.4 | 25.6-52.3 | | | | | | 133 |

The present invention may be embodied in other forms without departing from the spirit and the essential attributes thereof, and, accordingly, reference should be made to the appended claims, rather than to the foregoing specification, as indicated the scope of the invention.

We claim:

1. A membrane comprises:
an extruded, wet processed microporous sheet consisting essentially of a first ultra high molecular weight polyethylene having a first molecular weight, as measured by intrinsic viscosity (IV), in a range of 7<IV<15 and a second ultra high molecular weight polyethylene having a second molecular weight, as measured by intrinsic viscosity (IV), in a range of IV>15, said first molecular weight and said second molecular weight being greater than 1 million and being different from one another, the microporous sheet having a thickness in a range of 10-25 microns and interconnected spherical and/or elliptical pores, and characteristics selected from the group consisting of: a porosity between 25 and 85%; a puncture strength of greater than 300 gr-force/mil (25 microns); a MacMullin Number between 6-15; a Gurley Number of less than 60 sec/10 cc/mil; and combinations thereof.

2. The membrane of claim 1 where said microporous sheet having a porosity ranging from 32 to 58%.

3. The membrane of claim 1 where said microporous sheet having an average pore size between 0.01 to 0.5 microns.

4. The membrane of claim 1 where said microporous sheet further consisting of a viscoelastic lubricant (VEL), said VEL being selected from the group consisting of: fatty acid esters, ethoxylated fatty acid esters, glycol esters, PEG esters, glycerol esters, ethoxylated esters, sorbitol esters, ethoxylated sorbitol esters, aromatic ethoxylates, alcohol ethoxylates, mercaptan ethoxylates, modified ethoxylates, amide surfactants, phosphate esters, phosphonate esters, phosphite esters, alkyl sulfates, fatty acid ethers, alkyl ether sulfates, alkylaryl ether sulfates, sulfonates, naphthalene sulfonates, sulfosuccinates, sulfonated esters, sulfonated amides, alkyl ether carboxylates, alkylaryl ether carboxylates, quaternary amines, amino quaternary amines, ethoxylated amines, imidazoline derivatives, betaines, sultaines, aminopropionate, catechol derivatives, saturated fatty acids, unsaturated fatty acids, and combinations thereof.

5. The membrane of claim 1 wherein the microporous sheet further comprises a third polyolefin with a molecular weight of less than $0.5 \times 10^6$.

6. The membrane of claim 1 wherein said sheet being made of a solution including said first ultra high molecular weight polyethylene, said second ultra high molecular weight polyethylene, and a hydrocarbon liquid or some other substance which is at least partially extracted by a volatile solvent.

7. A battery separator comprising the membrane of claim 1.

8. A membrane comprises an extruded, wet processed microporous sheet being made of a solution of a first ultra high molecular weight polyethylene having a first molecular weight, as measured by intrinsic viscosity (IV), in a range of 7<IV<15 and a second ultra high molecular weight polyethylene having a second molecular weight, as measured by intrinsic viscosity (IV), in a range of IV>15, said first molecular weight and said second molecular weight being greater than 1 million and being different from one another, the microporous sheet having a thickness in a range of 10-25 microns, an average pore size consisting of a range of 0.01-0.5 microns, and interconnected spherical and/or elliptical pores, and characteristics selected from the group consisting of: a porosity between 25 and 85%; a puncture strength of greater than 300 gr-force/mil (25 microns); a MacMullin Number between 6-15; a Gurley Number of less than 60 sec/10 cc/mil; and combinations thereof.

9. The membrane of claim 8 wherein the membrane having an intrinsic viscosity greater than or equal to 6.3.

10. The membrane of claim 9 wherein said intrinsic viscosity being greater than or equal to 7.7.

11. The membrane of claim 8 wherein the microporous sheet further consisting of a viscoelastic lubricant (VEL), said VEL being selected from the group consisting of: fatty acid esters, ethoxylated fatty acid esters, glycol esters, PEG esters, glycerol esters, ethoxylated esters, sorbitol esters, ethoxylated sorbitol esters, aromatic ethoxylates, alcohol ethoxylates, mercaptan ethoxylates, modified ethoxylates, amide surfactants, phosphate esters, phosphonate esters, phosphite esters, alkyl sulfates, fatty acid ethers, alkyl ether sulfates, alkylaryl ether sulfates, sulfonates, naphthalene sulfonates, sulfosuccinates, sulfonated esters, sulfonated amides, alkyl ether carboxylates, alkylaryl ether carboxylates, quaternary amines, amino quaternary amines, ethoxylated amines, imidazoline derivatives, betaines, sultaines, aminopropionate, catechol derivatives, saturated fatty acids, unsaturated fatty acids, and combinations thereof.

12. The membrane of claim 8 wherein said solution also includes a hydrocarbon liquid or some other substance which is at least partially extracted by a volatile solvent.

13. The membrane of claim 8 wherein the microporous sheet further comprises a third polyolefin with a molecular weight of less than $0.5 \times 10^6$.

14. A battery separator comprising the membrane of claim 8.

15. A lithium battery comprising: a membrane of an extruded, wet processed microporous sheet being made of a solution of a first ultra high molecular weight polyethylene having a first molecular weight, as measured by intrinsic viscosity (IV), in a range of 7<IV<15 and a second ultra high molecular weight polyethylene having a second molecular weight, as measured by intrinsic viscosity (IV), in a range of IV>15, said first molecular weight and said second molecular weight being greater than 1 million and being different from one another, the microporous sheet having a thickness in a range of 10-25 microns, an average pore size consisting of a range of 0.01-0.5 microns, interconnected spherical and/or elliptical pores, and characteristics selected from the group consisting of: a porosity between 25 and 85%; a puncture strength of greater than 300 gr-force/mil (25 microns); a MacMullin Number between 6-15; a Gurley Number of less than 60 sec/10 cc/mil; and combinations thereof.

16. The membrane of claim 15 wherein the microporous sheet further comprises a third polyolefin with a molecular weight of less than $0.5 \times 10^6$.

17. A lithium battery comprising: a membrane of an extruded, wet processed microporous sheet consisting essentially of a first ultra high molecular weight polyethylene having a first molecular weight, as measured by intrinsic viscosity (IV), in a range of 7<IV<15 and a second ultra high molecular weight polyethylene having a second molecular weight, as measured by intrinsic viscosity (IV), in a range of IV>15, said first molecular weight and said second molecular weight being greater than 1 million and being different from one another, the microporous sheet having a thickness in a range of 10-25 microns, interconnected spherical and/or elliptical pores, and characteristics selected from the group consisting of: a porosity between 25 and 85%; a puncture strength of greater than 300 gr-force/mil (25 microns); a MacMullin Number between 6-15; a Gurley Number of less than 60 sec/10 cc/mil; and combinations thereof.

18. The membrane of claim 17 wherein the microporous sheet further comprises a third polyolefin with a molecular weight of less than $0.5 \times 10^6$.

* * * * *